Jan. 30, 1940.                H. SMALL                 2,188,377
APPARATUS FOR DISPENSING PHOTOGRAPHIC RIBBON FILM
Filed July 10, 1935          5 Sheets-Sheet 1
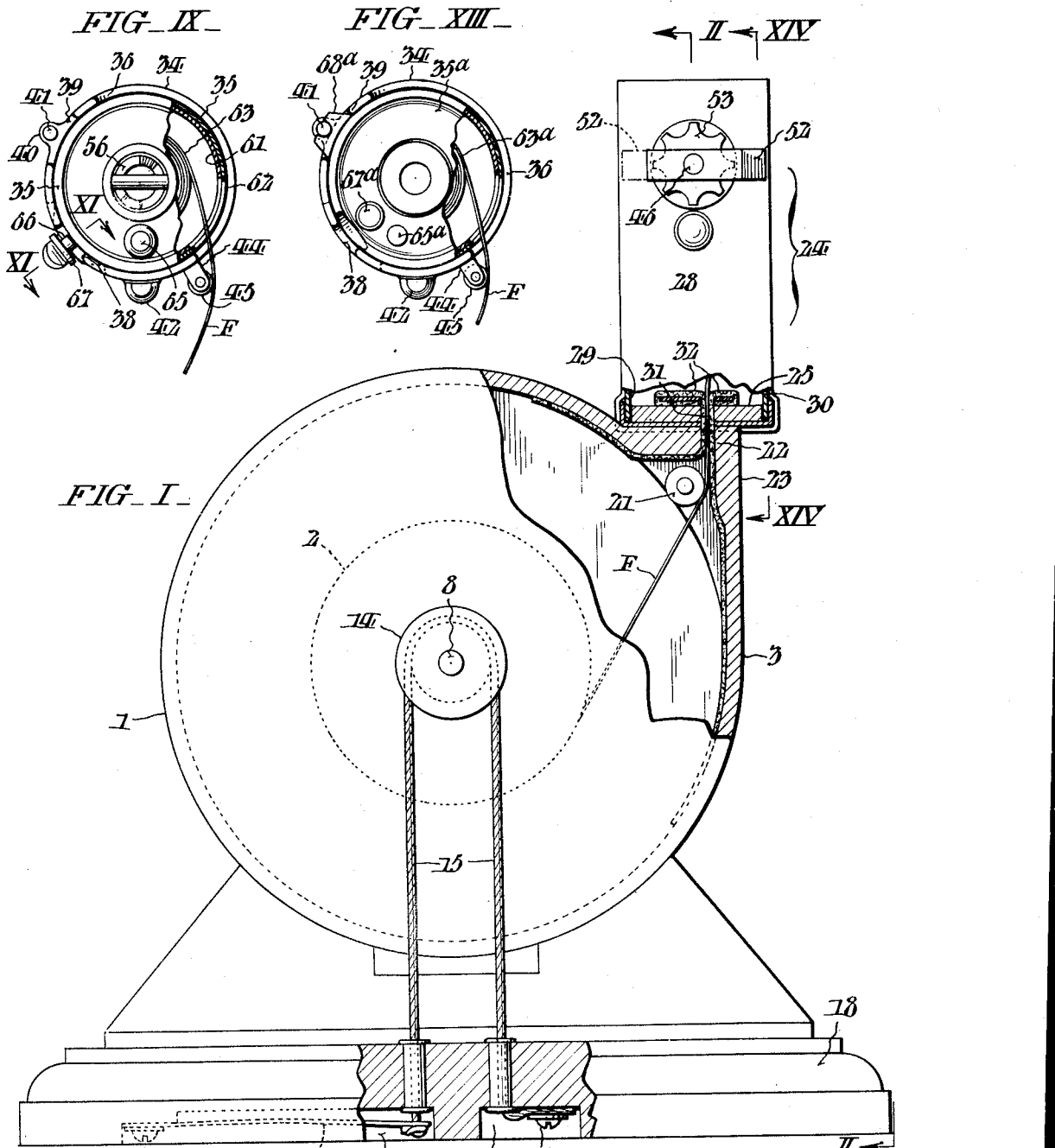

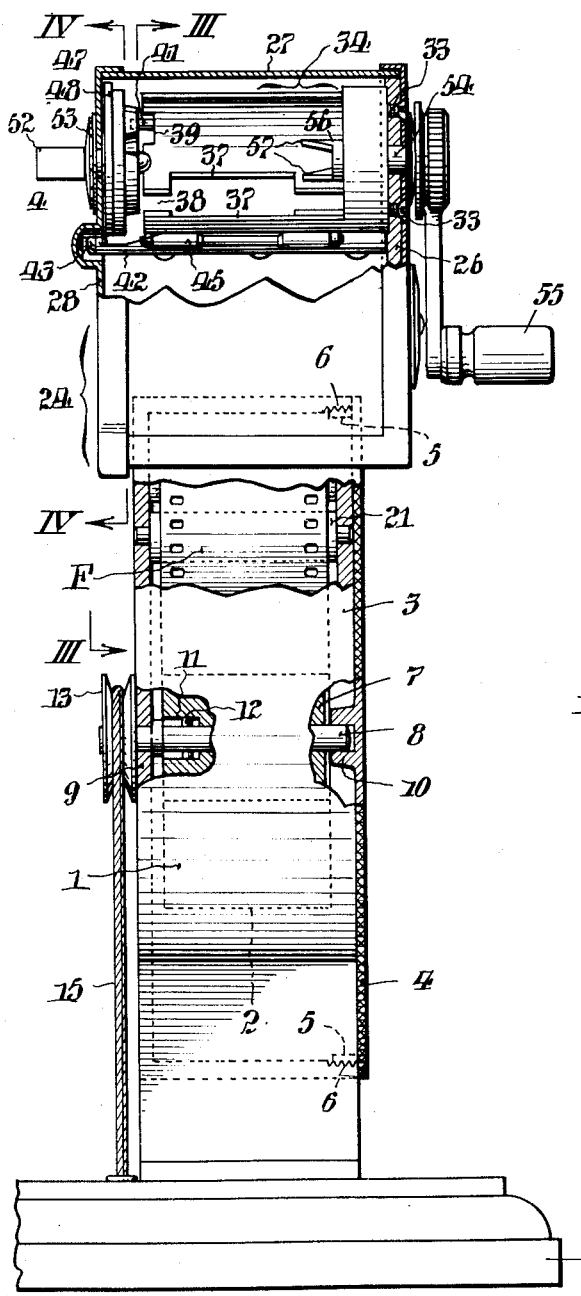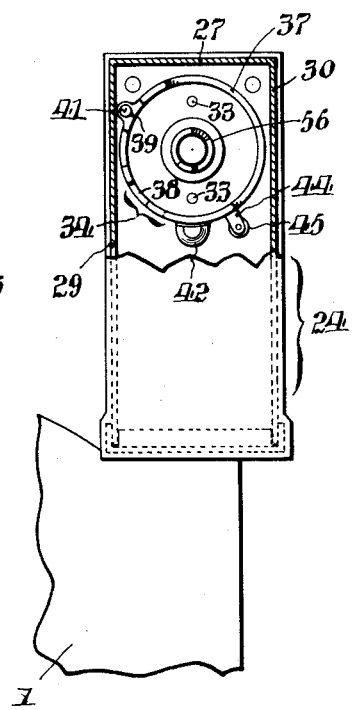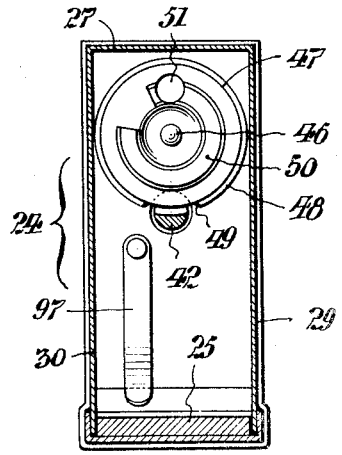

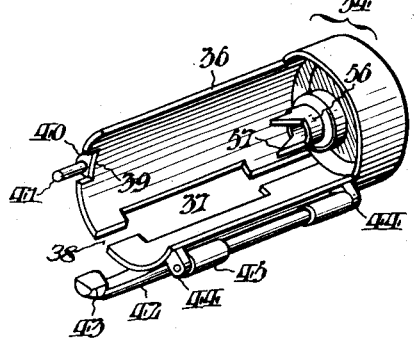
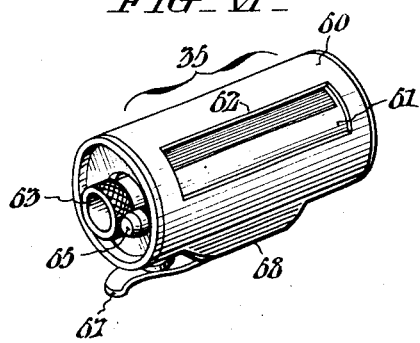
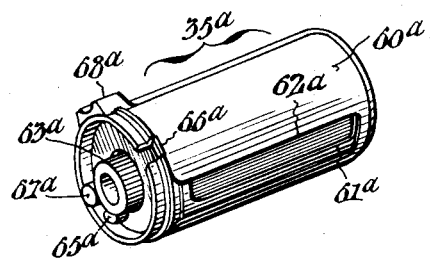
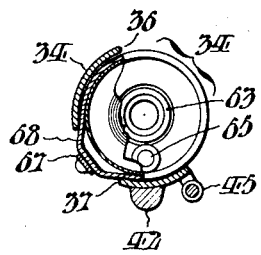

Jan. 30, 1940. H. SMALL 2,188,377
APPARATUS FOR DISPENSING PHOTOGRAPHIC RIBBON FILM
Filed July 10, 1935 5 Sheets-Sheet 4
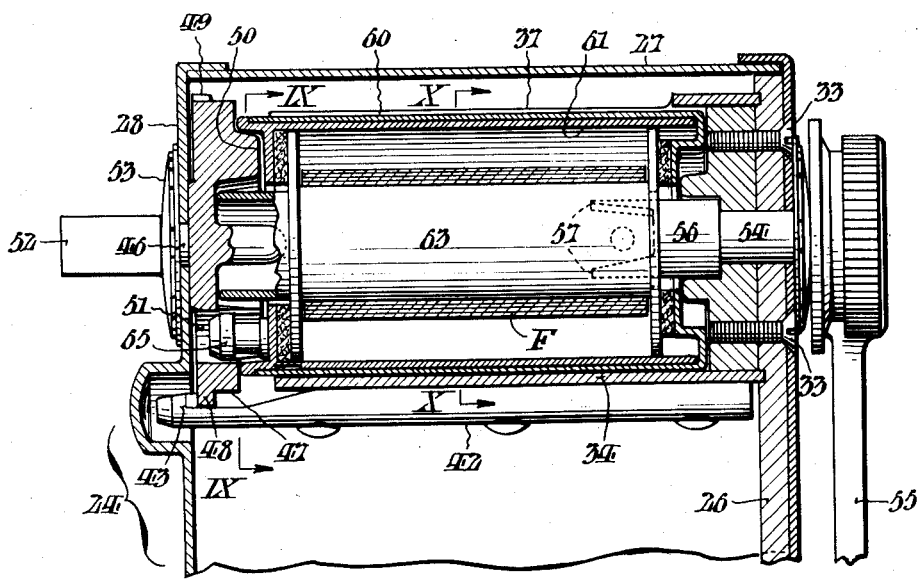
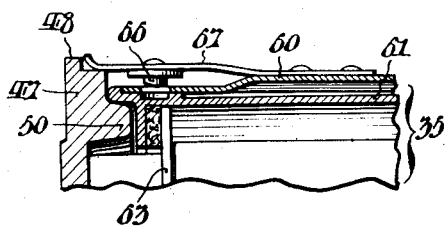
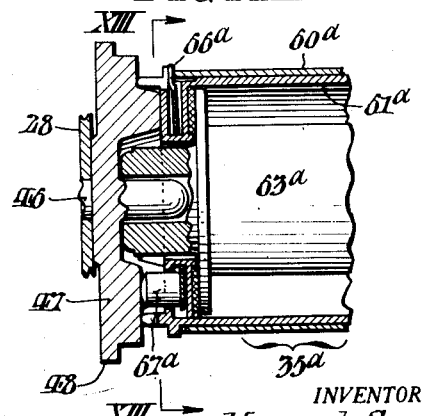
WITNESSES:
John C. Bergner
Hubert Fuchs
INVENTOR:
Howard Small,
BY Fraley Paul
ATTORNEYS.

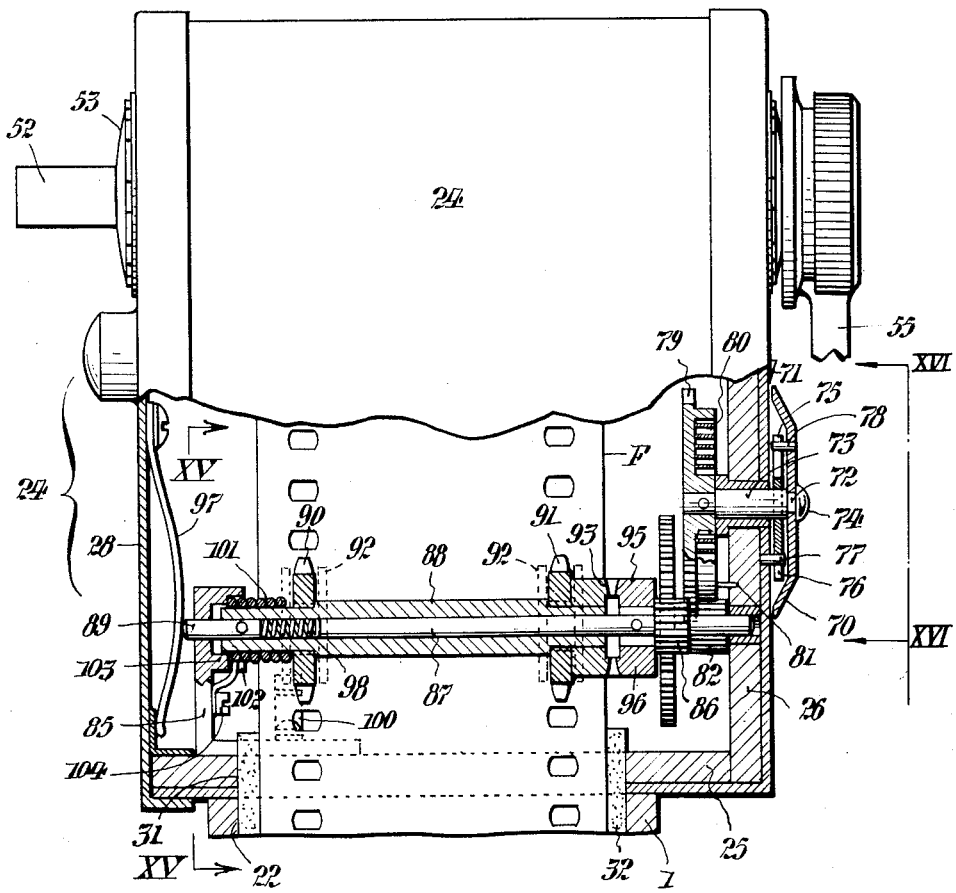
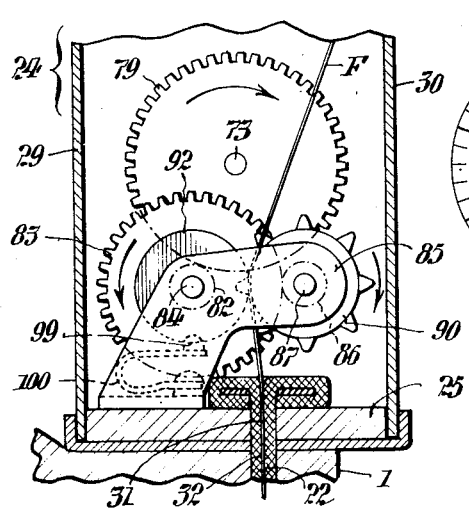
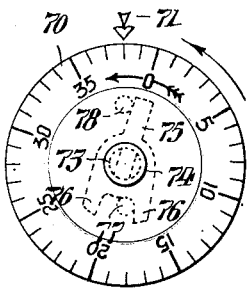
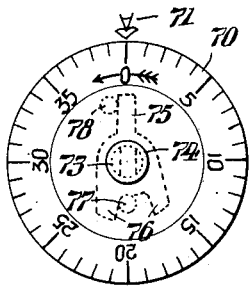

Patented Jan. 30, 1940

2,188,377

UNITED STATES PATENT OFFICE 2,188,377

APPARATUS FOR DISPENSING PHOTOGRAPHIC RIBBON FILM

Howard Small, Philadelphia, Pa.

Application July 10, 1935, Serial No. 30,596

20 Claims. (Cl. 242—55)

This invention relates to methods of, and apparatus for dispensing photographic ribbon film.

In the preparation of photographic ribbon film for the market, it is the practice to wrap various lengths of the film, from six to thirty-six exposures, with heavy black paper, upon spools for use in standardized film camera magazines. The spooling of the film must be done in specially equipped dark rooms in the factories; and after being loaded with the film, the spools are enveloped in tin-foil and placed in separate cartons. Such preparation of film is costly, not only from the standpoint of the labor involved, but by virtue of the expensive materials used in the packaging, which costs add very materially to the sale price of the film.

In the main, my invention is directed toward overcoming the drawbacks which have been mentioned, that is to say: I aim to make it possible to dispense photographic film in any desired lengths over the counters of retail stores in broad daylight from comparatively large supply rolls, with a view toward eliminating costly handling and packaging in the factories, and effecting a corresponding saving to the consumer. These advantages I realize, as hereinafter more fully disclosed, in a simple form of dispensing apparatus having a light-tight casing for a revoluble bulk supply of ribbon film, and a separable housing over a film egress slit in the casing with means whereby the spools of standard film camera magazines placed on a holder within it may be turned to take up the ribbon from the supply, and with a lock for securing it in place.

Another object of my invention is to afford means whereby the shutters of the magazines are automatically opened incident to the actuation of the lock in securing the housing so that scratching of the film ribbon is avoided as it is being wound on the magazine spools, and whereby the magazine shutters are automatically closed when the lock is actuated to release the housing so as to prevent fogging of the film in the newly charged magazines.

Another object of my invention is to provide visible indicator means for indicating the amount of film being wound upon the spools of the magazines, and means for automatically resetting the indicator to re-starting position in preparation for succeeding dispensing operation upon removal of the housing aforesaid.

Other objects and advantages of this invention will appear from the detailed description which follows of the attached drawings, wherein Fig. I is a side elevation of my improved film dispensing apparatus with portions broken out and others in section to expose important structural details which would otherwise be hidden.

Fig. II is a view partly in end elevation and partly in section taken as indicated by the arrows II—II in Fig. I.

Fig. III is a fragmentary detail view partly in end elevation and partly in section looking as indicated by the arrows III—III in Fig. II.

Fig. IV is a sectional view taken as indicated by the arrows IV—IV in Fig. II.

Fig. V is a perspective view of the holder.

Figs. VI and VII are perspective views respectively of two standard types of film camera magazines for the loading of which my dispensing apparatus is particularly adapted.

Fig. VIII is a fragmentary detail view corresponding to Fig. II drawn to a larger scale with a film camera magazine of the type shown in Fig. VI in the holder provided for it in the apparatus.

Fig. IX is a detail view looking as indicated by the arrows IX—IX in Fig. VIII.

Fig. X is a detail sectional view taken as indicated by the arrows X—X in Fig. VIII.

Fig. XI is a detail sectional view taken as indicated by the arrows XI—XI in Fig. IX.

Fig. XII is a fragmentary sectional view corresponding to Fig. VIII with a film camera magazine of the type shown in Fig. VII in the holder.

Fig. XIII is a view looking as indicated by the arrows XIII—XIII in Fig. XII.

Fig. XIV is a sectional view on an enlarged scale taken as indicated by the arrows XIV—XIV in Fig. I showing more particularly the indicator mechanism by aid of which the amount of film dispensed each time by the apparatus is accurately measured.

Fig. XV is a fragmentary sectional view taken as indicated by the arrows XV—XV in Fig. XIV.

Fig. XVI is a detail view looking as indicated by the arrows XVI—XVI in Fig. XIV and showing the dial of the indicator mechanism in starting position; and Fig. XVII is a view corresponding to Fig. XVI showing the position of the indicator dial when the maximum amount of film capable of being dispensed at one time by the apparatus has been measured.

As herein illustrated, the photographic ribbon film dispensing apparatus of my invention comprises a circular light-tight casing I containing a roll 2 of the film F which is to be dispensed. At one side, the casing I has a removable cover 3 (Fig. II) permitting access to the interior, said cover being in the form of a disk with a roughened grasp edge 4, and an inward annular screw flange 5 engaging internal threads 6 of said casing. The core 7 of the supply roll 2 is removably mounted on a shaft 8 whereof one end passes through a bearing aperture in the fixed side 9 of the casing 1, while the other end is rotatably supported in an axial bearing boss 10 of the cover 3. The roll 2 is prevented from rotating independently of the shaft 8 through engagement of key slots 11 in the core 7 by key lugs 12 on said shaft. Secured to the projecting end of the shaft 8 is a sheave 13, which, see Fig. I, is engaged by a brake strap 15 having one of its ends anchored by a screw 16 within a recess 17 at the underside of the base 18 of the casing 1, and its other end fastened to the free end of a leaf spring 19 within another recess 20 in the underside of the base, said spring exerting tension on the strap to yieldingly resist withdrawal of the film F from the roll 2. In being drawn from the casing 1 as later on explained, the film F passes over an idler roller 21 by which it is guided to a vertical slit 22 in an upward tangential offset 23 of said casing.

Mounted on the casing 1 is a small rectangular housing 24 with the bottom 25 thereof permanently secured to the horizontal top surface of the casing offset 23 and with its rear end wall 26 (Fig. II) fixed to said bottom. The top 27, front end wall 28, and opposite side walls 29 and 30 of the housing 24 are permanently united, and together constitute a separable cover. The fixed bottom 25 of the housing 24 has an egress slit 31 in continuation of the slit 22 in the casing offset 23, said slits being faced with a lining 32 of velvet, felt or the like which yieldingly bears against the film F and excludes light from the casing 1. Secured by screws 33 to the fixed end wall 26 of the housing 24 near the top is a forwardly projecting holder 34 adapted to support standard forms of cylindric film camera magazines such as shown at 35 and 35a in Figs. VI and VII. From Fig. V it will be observed that the holder 34 is fashioned from sheet metal tubing with one side cut away as at 36, and provided with a longitudinal slot 37, as well as with edge notches 38 and 39 at its open front end. A lug 40 projecting beyond the periphery of the holder 34 supports a pin 41 at the front in line with the edge notch 39. Fastened to the bottom of the holder 34 and projecting beyond the front edge of the latter is a bar 42 with a hook end 43; and supported by bearing lugs 44 adjacent the bottom edge of the cut-out 37 in said holder is a film guiding roller 45.

To removably secure the cover of the housing 24 against accidental displacement on the casing 1 I have provided a rotary lock having a shaft 46 journaled in the end wall 28 of said housing in axial alignment with the holder 34. To the inner end of the shaft 46 is secured a disk 47 (Figs. II, IV, VIII, XI and XII) having a peripheral flange 48 with a notch 49, an inwardly projecting segmental flange 50 and an aperture 51; while to the outer end of the shaft 46 of the lock is secured a manipulating key 52. The movement of the shaft 46 is yieldingly resisted by a friction spring washer shown at 53.

Journaled in the fixed end wall 26 of the housing 24 axially of the holder 34 is a shaft 54 (Figs. II and VIII) to the outer end of which is affixed a crank handle 55, and to the inner end of which is affixed a collar 56 with tooth projections 57 to engage the spools of the film camera magazines placed in the holder 34 as later on explained.

The film camera magazine 35 shown in perspective in Fig. VI consists of a tubular body shell 60 and a rotatable shutter 61 which telescopically engages within said shell, and which is adapted to close an opening 62 in the side of the latter, whereby access may be had to the spool 63 (Fig. VIII) within the magazine. The shutter 61 is rotatable by means of a projection 65 on its closed end and adapted to be locked in closed position by a latch pin 66 (Fig. XI) at the free end of a leaf spring 67 on a protuberance 68 of the body shell 60 of the magazine.

The film camera magazine 35a shown in perspective in Fig. VII is generally like the magazine 35 of Fig. VI in that it has a tubular shell or body 60a; a rotatable shutter 61a telescoped within the body to close an access opening 62a in the side of the latter; exposing the spool 63a; a projection 65a on a closed end of the shutter whereby the latter may be engaged and rotated. The magazine 35a however has a different form of latch 66a for locking the shutter 61a closed, said latch being operable by a spring influenced stud 67a which protrudes through the closed end of said shutter adjacent the lug 65a.

The procedure in loading a cartridge of the type 35 is as follows:—

Upon removal of the cover of the housing 24, the end of the film F projecting from the slit of the casing is engaged in the slot of the spool 63 of the magazine; the spool placed within the magazine, and the shutter 61 closed. The magazine 35 is thereupon placed in the holder 34 with its protuberance 68 lodged in the slot 37 of said holder as shown in Fig. X, so that the shell 61 is held against rotation during subsequent operations. In the placement of the magazine 35 in the holder 34 as just explained, the spool 63 is engaged at one end by the projections 57 of the collar 56 on the crank handle shaft 54. The cover of the housing 24 is next applied over the holder 34 with the lock actuating key 52 in the dot and dash line position of Fig. I and with the disk 47 of the rotary lock positioned as shown in Fig. IV. As the housing cover is applied, the projection 65 of the magazine 35 is engaged within the aperture 51 of the locking disk 47, and the leaf spring 67 engaged by the segmental flange 50 of the disk to withdraw the latch 66 so that the shutter 61 of the magazine can be rotated. The lock actuating key 52 is thereupon turned clockwise to the full line position of Fig. I with attendant engagement of the peripheral flange 48 of the disk behind the hook 43 on the holder 34 to lock the cover, and opening of the shutter 61 of the magazine 35 through coaction between the shutter projection 65 and the engaging hole 51 of said disk. The crank handle 55 is then turned to wind the desired amount of film F on the magazine spool 63 whereupon the cover of the housing 24 is unlocked by turning the key 52 counter-clockwise from the full line position of Fig. I to the dot and dash line position with incidental closing of the magazine shutter 61, and said cover removed. The film F is finally severed close to the magazine 35, and the latter removed from the holder 34 in readiness for use in the camera.

The procedure followed in loading the cartridge of the type 35a in Fig. VII is generally similar to that described in connection with the loading of the magazine 35. In placing the magazine 35a in the holder 34 the lug 68a on the shell 68 is engaged with the edge notch 39 and the pin 41 and thus held against rotation during the loading operation. When the cover of the housing 24 is applied over the holder 34, the segmental flange of the locking disk 47 presses the projection 67a inward to unlock the shutter 61a of the magazine, while the projection 65a on the shutter of said magazine is received within the hole 51 of the disk 47 in the same manner as the projection 65 of the magazine 35 so that the shutter is opened when the lock-actuating key 52 is turned to secure the housing cover.

In order that the amount of the film dispensed during each actuation of the apparatus may be accurately measured, I have provided an indicating mechanism which includes a dial 70 adapted for coordination with a pointer 71 at the back of the housing 24, see Figs. XIV, XVI and XVII, said dial being graduated in this instance so that one complete rotation thereof corresponds to a length of forty exposures of the film. As shown, the dial 70 is fitted over a polygonal projection 72 of a shaft 73 journaled in the back wall of the housing 24 below the shaft 46, and is held in place by a screw 74. Free on the shaft 72 immediately behind the dial 70 is a stop finger 75 capable of free movement within the limits imposed by engagement of spaced lugs 76 thereon with a fixed pin 77 projecting outwardly from the housing wall 28, said finger lying in the path of a stud 78 at the back of the dial. Fixed on the inner end of the shaft 72 is a gear wheel 79 with a side hollow for a volute spring 80 whereof the inner end is made fast to the hub of said gear and the outer end to a fixed pin 81 on the housing wall 28. The gear wheel 79 is driven by a pinion 82 fast on another gear wheel 83 which is freely rotatable about another horizontal shaft 84 journaled at one end in the housing wall 28 and the other end in a bearing bracket 85 on the bottom 25 of the housing 24. The gear wheel 83 meshes in turn with a pinion 86 on another horizontal shaft 87 having one end thereof journaled in the housing wall 28. The shaft 87 extends into one end of a sleeve 88 (Fig. XIV), which, at its opposite end, has a trunnion extension 89 journaled in the bracket 85. Fixed on the sleeve 88 are laterally spaced sprocket pinions 90 and 91 whereof the teeth engage the marginal holes of the film F, the latter being held to the sprocket pinions by flanged collars 92 on the shaft 84. The hub of the sprocket pinion 91 has clutch teeth 93 which are adapted to engage opposing clutch teeth 95 on a collar 96 secured to the shaft 87 alongside the gear pinion 86. A stiff leaf spring 97 on the end wall 28 of the separable cover of the housing 24 presses upon the trunnion end 89 of the sleeve 88 as shown in Fig. XIV, and maintains said sleeve clutched to the collar 96, so that, through the interposed gearing, the dial 70 is rotated in the direction of the arrow in Fig. XVI relative to the pointer 71 as the crank handle 55 is turned to wind the film F onto the spool of the camera magazine within the housing 24 as hereinbefore explained. During rotation of the dial 70 incident to measuring the film, the volute spring 80 is gradually wound upon the hub of the gear wheel 79. However, when the cover of the housing 24 is removed at the completion of a winding operation, a compression spring 98 within the sleeve 88 axially shifts the latter toward the left in Fig. XIV with attendant unclutching of the said sleeve from the shaft 87, whereupon the volute spring 80 re-acts upon the gear wheel 79 to reversely rotate the dial 70, thereby re-setting the latter to starting position in readiness for a succeeding dispensing operation. It will be observed from Fig. XVI that, due to the last motion allowed the stop 75, the dial 70 will be arrested with a zero indication thereon a few graduations beyond the pointer, the amount of film represented by these few graduations being that exposed to light between the slit and the magazine when the housing is removed. Each purchaser thus receives the amount of film asked for, plus the useless excess above referred to without being charged for the latter. In Fig. XVII, the dial 70 has been turned to the full extent with its stud 78 arrested by the stop finger 75.

On the periphery of one of the collars 92 is a projection 99 which acts upon a bow spring 100 secured to the bottom 25 of the housing 24 to produce a clicking sound for each exposure length of the film measured and thereby facilitate accurate dispensing of the film in cooperation with the dial 70.

Back-winding any exposed portions of the film F into the casing 1 is prevented by a contractile spring 101 which encircles the left hand end (Fig. XIV) of the sleeve 88, and which has one end thereof engaged in a notch 102 in a boss 103 of the bracket 85 and anchored by a screw 104 to said bracket. Normally, rotation of the sprocket wheels 90 in the direction indicated by the arrow in Fig. XV tends to expand the contractile spring 101 and thereby prevents the latter from gripping of the sleeve 88. Reversal of the sprockets on the other hand is prevented by contraction of the spring 101 and gripping of the sleeve 88 against rotation.

Having thus described my invention, I claim:

1. A photographic ribbon film dispensing apparatus comprising a light-tight casing with a support for a rotatable supply of the film, and with a light-tight egress slit for the ribbon film; a light-tight housing securable over the slit of the casing; a mounting within the housing to receive a standard film camera magazine having a shutter to close a spool access opening therein; means for turning the magazine spool to take up film from the supply aforesaid; and means operated incident to the application and removal of the housing to respectively open and close the shutter of the magazine.

2. A photographic ribbon film dispensing apparatus comprising a light-tight casing with a support for a rotatable supply of the film, and with a light-tight egress slit for the ribbon film; a light-tight housing securable over the slit of the casing; a mounting within the housing to receive a standard film camera magazine having a shutter to close the spool access opening therein; means for turning the magazine spool to take up film from the supply aforesaid; a lock for securing the housing in place; and means embodied in the lock to respectively open and close the shutter of the magazine within the housing when the latter is locked and unlocked.

3. A photographic ribbon film dispensing apparatus comprising a light-tight casing with a support for a rotatable supply of the film, and with a light-tight egress slit for the ribbon film; a light-tight housing securable over the slit of the casing; a mounting within the housing to receive a standard film camera magazine having a shutter to close the spool access opening therein, and a latch to lock the shutter closed; means for turning the magazine spool to take up film from the supply aforesaid; a lock for securing the housing in place; and means embodied in the lock to operate the latch of the magazine within the housing and to open the magazine shutter when said lock is actuated to secure the cover, and to close the magazine shutter when the lock is actuated to release the housing.

4. A photographic ribbon film dispensing apparatus comprising a light-tight casing with a support for a rotatable supply of the film, and with a light-tight egress slit for the ribbon film; a light-tight housing over the slit of the casing; a mounting within the housing adapted to receive a standard film camera magazine having a rotatable shutter to close a spool access opening therein; means for turning the magazine spool to take up film from the supply aforesaid; a rotary lock for securing the housing in place; and means for opening the shutter of the magazine within the housing when the lock is actuated to secure the housing, and for closing said shutter when the lock is actuated to release the housing.

5. A photographic ribbon film dispensing apparatus comprising a light-tight casing with a support for a rotatable supply of the film, and with a light-tight egress slit for the ribbon film; a light-tight housing securable over the slit of the casing; a mounting within the housing adapted to receive a standard film camera magazine having a rotatable shutter to close a spool access opening therein, and a latch to lock the shutter closed; means for turning the magazine spool to take up film from the supply aforesaid; a rotary lock for securing the housing in place; and means for withdrawing the latch of the magazine within the housing and opening the magazine shutter when the lock is actuated to secure the housing, and for closing the magazine shutter when the lock is actuated to release the housing.

6. A photographic ribbon film dispensing apparatus comprising a light-tight casing with a support therein for a rotatable supply of the film, and with a light-tight egress slit for the ribbon film; a light-tight housing securable over the slit of the casing; a mounting within the housing to receive a standard film camera magazine; means for turning the magazine spool to take up the film from the supply aforesaid; means to indicate the amount of film wound on the magazine spool; and means automatically operated upon removal of the housing to reset the indicating means to starting position for the next winding.

7. A photographic ribbon film dispensing apparatus comprising a light-tight casing with a support therein for a rotatable supply of the film, and with a light-tight egress slit for the ribbon film; a light-tight housing securable over the slit of the casing; a mounting within the housing to receive a standard film camera magazine; means for turning the magazine spool to take up the film from the supply aforesaid; and means to indicate the amount of film wound upon the magazine including a graduated dial deriving motion from the film, a spring wound by rotation of the dial, and means actuated upon removal of the housing aforesaid at the end of a dispensing operation to release the dial for restoration to starting position by the spring.

8. A photographic ribbon film dispensing apparatus comprising a light-tight casing with a support therein for a rotatable supply of the film, and with a light-tight egress slit for the ribbon film; a light-tight housing securable over the slit of the casing; a mounting within the housing to receive a standard film camera magazine; means for turning the magazine spool to take up the film from the supply aforesaid; and means to indicate the amount of film wound upon the magazine including a dial driven through gearing by the film, a spring wound by rotation of the dial, and a clutch embodied in the gearing and automatically released upon removal of the housing aforesaid at the end of a dispensing operation to permit restoration of the dial to starting position by the spring.

9. A photographic ribbon film dispensing apparatus comprising a light-tight casing with a support therein for a rotatable supply of the film, and with a light-tight egress slit for the ribbon film; a light-tight housing securable over the slit of the casing; a mounting within the housing to receive a standard film camera magazine; means for turning the magazine spool to take up the film from the supply aforesaid; and means to indicate the amount of film wound upon the magazine including a graduated dial deriving motion from the film, a spring wound by rotation of the dial, and means actuated upon removal of the housing aforesaid at the end of a dispensing operation to release the dial, a stop permitting the dial to return to the action of the spring, and a stop permitting the dial to be returned to a starting position somewhat beyond its zero graduation in order to compensate for an excess length of the film exposed above the slit of the casing incident to attaching the end of the film to the magazine spool at the beginning of the dispensing operation.

10. A photographic ribbon film dispensing apparatus comprising a light-tight casing with a support therein for a rotatable supply of the film, and with a light-tight egress slit for the ribbon film; a light tight housing securable over the slit of the casing; a mounting within the housing to receive a standard film camera magazine; means for turning the magazine spool to take up the film from the supply aforesaid; and means to prevent back winding of the film into the casing.

11. A photographic ribbon film dispensing apparatus comprising a light-tight casing with a support therein for a rotatable supply of the film, and with a light-tight egress slit for the ribbon film; a light-tight housing securable over the slit of the casing; a mounting within the housing to receive a standard film camera magazine; means for turning the magazine spool to take up the film from the supply aforesaid; sprockets engaging marginal holes in the film; and means confining the sprockets to rotation in one direction to prevent back winding of the film into the casing.

12. A photographic ribbon film-dispensing apparatus comprising a light-tight casing with a support therein for a reel containing a supply of the film; a light-tight housing securable over an egress slit in the casing; a mounting within the housing for reception of a film camera magazine enclosing a spool; means for turning the magazine spool to draw film from the supply reel; and means for preventing reverse movement of the film.

13. A photographic ribbon film dispensing apparatus comprising a light-tight casing for a supply of ribbon film, said casing having a light-tight egress slit for the film; a light-tight housing securable over the slit in the casing; a mounting within the housing to receive a standard film camera magazine of the type having a rotary shutter to close a spool access opening therein; means externally of the housing for turning the magazine spool to take up the film from the supply aforesaid; and means also externally of the housing whereby the shutter of the magazine can be opened and closed.

14. In a device for loading film on a spool, said spool being provided with a housing and adapted to be used with the housing in a camera, means forming a film magazine, a spool case into which film can be passed from the magazine, and capable of being rendered substantially light tight, said case being adapted to receive the spool and its housing, means for rotating the spool to wind film thereon, said housing being provided with an aperture and a closure therefor, through which aperture the film is intended to pass to the spool, and means operable externally of the case for closing the aperture.

15. In a device for winding film on a spool having a tubular housing with an aperture through which film can be passed to the spool, as well as a rotatable closure member telescoped with respect to the tubular housing, said closure member having a projection extending in a direction parallel to the axis of the member and spaced radially from the axis, as well as a spring supported pin for locking the closure member against rotation upon rotating said member to closing position, a substantially light tight case for rotatably supporting the spool and its housing, means operable externally of the case for winding film on the spool, said case having a removable light tight cover, means operable externally of the case and supported on the cover for operating the projection to rotate the closure member with respect to the housing, and means internally of the case for engaging the spring support for the locking pin to restrict rotation of the housing.

16. In a device for winding film on a spool having a housing with an aperture through which the film can be passed to the spool, as well as a closure for the aperture, said spool and its housing being adapted to be removed after loading, for use in a camera, a substantially light tight case for the spool and its housing, means operable externally of the case for winding the film on the spool, means operable externally of the case for operating the closure, and a film magazine in light tight relation to the case and externally thereof.

17. In a device for winding film on a spool having a tubular housing with an aperture through which film can be passed to the spool, as well as a rotatable closure member telescoped with respect to the tubular housing, said spool and its housing being adapted to be removed after loading, for use in a camera, a substantially light tight case for the spool and its housing, means operable externally of the case for winding the film on the spool, means operable externally of the case for rotating the closure member with respect to the housing, and a film magazine in light tight relation to the case, and externally thereof, there being a slit in the body of the case for the entry of film from the magazine.

18. In a device for winding film on a spool having a tubular housing with an aperture through which film can be passed to the spool, as well as a rotatable closure member telescoped with respect to the tubular housing, said closure member having a projection extending in a direction parallel to the axis of the member and spaced radially from the axis, a substantially light tight case for the spool and its housing, means operable externally of the case for winding film on the spool, said case having a removable light tight cover, means operable externally of the case and supported on the cover for operating the projection to rotate the closure member with respect to the housing, and a film magazine in light tight relation to the case and outside thereof.

19. In combination, a closed container containing photographic film, an open casette in said container, a cover on the container to be opened in insert or remove the casette, means for transferring film from the container to the casette to load the latter, means for locking the cover while the casette is being loaded, means for closing the casette after it has been loaded, mechanism on said container for actuating the casette closing means from the outside and for unlocking the said cover locking means, said mechanism including means compelling the closing of the casette before the said cover is unlocked.

20. In combination a closed container containing undeveloped photographic film and having a film outlet, a casette for receiving film from the container through said outlet, a casing supporting the casette in film receiving position adjacent said outlet, said casette including a cylinder for closing the casette, a pin on said cylinder and means on said casing operable from the outside thereof and extending within the casing in operative relation to the said pin for actuating the same to close the casette.

HOWARD SMALL.